United States Patent
Ohgushi et al.

(10) Patent No.: US 6,760,753 B1
(45) Date of Patent: Jul. 6, 2004

(54) ELECTRONIC MAIL COMMUNICATION APPARATUS AND RECORDING MEDIUM

(75) Inventors: Nobuo Ohgushi, Myozai-gun (JP); Chikayasu Bandoh, Tokushima (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/538,739

(22) Filed: Mar. 30, 2000

(30) Foreign Application Priority Data

Sep. 13, 1999 (JP) .......................................... 11-259184

(51) Int. Cl.[7] .............................................. G06F 13/00
(52) U.S. Cl. ........................ 709/206; 709/224; 713/502
(58) Field of Search ................................ 709/206, 224; 713/502

(56) References Cited

U.S. PATENT DOCUMENTS

| | | | | |
|---|---|---|---|---|
| 5,283,856 A | * | 2/1994 | Gross et al. | 706/47 |
| 5,802,253 A | * | 9/1998 | Gross et al. | 706/47 |
| 6,094,681 A | * | 7/2000 | Shaffer et al. | 709/224 |
| 6,108,688 A | * | 8/2000 | Nielsen | 709/206 |
| 6,199,103 B1 | * | 3/2001 | Sakaguchi et al. | 709/206 |
| 6,327,046 B1 | * | 12/2001 | Miyamoto et al. | 358/1.15 |
| 6,460,073 B1 | * | 10/2002 | Asakura | 709/206 |
| 6,473,812 B2 | * | 10/2002 | Motoyama | 710/15 |

* cited by examiner

*Primary Examiner*—Kenneth R. Coulter
(74) *Attorney, Agent, or Firm*—Staas & Halsey LLP

(57) ABSTRACT

Analysis information and event information to be executed when received E-mail corresponds to the analysis information are stored correspondingly. When the E-mail corresponding with the analysis information is received, the corresponding event is driven. Alternatively, the information specifying execution timing is added to the event information and, thereby, when the E-mail corresponding to the analysis information is received, the corresponding event information is defined as a monitoring object. When the execution timing specified in the execution timing information occurs, the event is driven.

13 Claims, 14 Drawing Sheets

TRANSMITTING DESTINATION INFORMATION

| | |
|---|---|
| EVENT GROUP ID | |
| TRANSMITTING DESTINATION ADDRESS | ADDRESS OF MAIL TRANSMITTING DESTINATION |
| SUBJECT: | TITLE OF MAIL TRANSMITTED |
| ANSWERING LIMIT DATE | ANSWERING LIMIT DATE FOR TRANSMITTING MAIL |
| ANSWERING DATE AND TIME | ANSWERING DATE FROM THE TRANSMITTING DESTINATION (BLANKED WHEN NO ANSWER MAIL IS RETURNED) |
| DEMAND DESTINATION ADDRESS | |

FIG. 2(a)

ANALYZING INFORMATION

| FROM: CONDITION | FROM: INFORMATION FOR CONDUCTING ANALYSIS WITH FROM: |
|---|---|
| SUBJECT: CONDITION | SUBJECT: INFORMATION FOR CONDUCTING ANALYSIS WITH SUBJECT: |
| FREE HEADER CONDITION | INFORMATION FOR CONDUCTING ANALYSIS WITH DESIRED HEADER |
| TEXT CONDITION | INFORMATION FOR CONDUCTING ANALYSIS WITH CONTENTS OF THE TEXT |

FIG. 2(b)

EVENT INFORMATION

| EVENT GROUP ID | REGISTER THE EVENT GROUP ID |
|---|---|
| EVENT TYPE | DESIGNATE THE EVENT TYPE TO BE DRIVEN |
| TRANSMITTING DESTINATION ADDRESS | (FROM: ADDRESS OF RECEIVING MAIL WHEN OMITTED) |
| SUBJECT: | (ADD "RE" BEFORE SUBJECT: OF RECEIVING MAIL WHEN OMITTED) |
| FREE HEADER INFORMATION | DESIGNATE THE DESIRED HEADER INFORMATION |
| TEXT | NAME OF FILE TO WHICH MAIL TEXT IS WRITTEN |
| ATTACHED FILE | ATTACHED FILE NAME |
| EXECUTION TIMING | DESIGNATE THE EVENT EXECUTION TIMING |
| EXECUTED FLAG | TURNED ON WHEN EVENT EXECUTION IS COMPLETED |

FIG. 2c

TRANSMITTING DESTINATION INFORMATION

| EVENT GROUP ID | |
|---|---|
| TRANSMITTING DESTINATION ADDRESS | ADDRESS OF MAIL TRANSMITTING DESTINATION |
| SUBJECT: | TITLE OF MAIL TRANSMITTED |
| ANSWERING LIMIT DATE | ANSWERING LIMIT DATE FOR TRANSMITTING MAIL |
| ANSWERING DATE AND TIME | ANSWERING DATE FROM THE TRANSMITTING DESTINATION (BLANKED WHEN NO ANSWER MAIL IS RETURNED) |
| DEMAND DESTINATION ADDRESS | |

FIG. 3(a)

ANALYZING INFORMATION

| FROM: CONDITION | |
|---|---|
| SUBJECT: CONDITION | USER REGISTRATION |
| FREE HEADER CONDITION | |
| TEXT CONDITION | |

FIG. 3(b)

EVENT INFORMATION

| EVENT GROUP ID | |
|---|---|
| EVENT TYPE | 1 |
| TRANSMITTING DESTINATION ADDRESS | |
| SUBJECT: | |
| FREE HEADER INFORMATION | |
| TEXT | mail.txt |
| ATTACHED FILE | tempu.doc |
| EXECUTION TIMING | AFTER AN HOUR AFTER REGISTRATION |
| EXECUTED FLAG | |

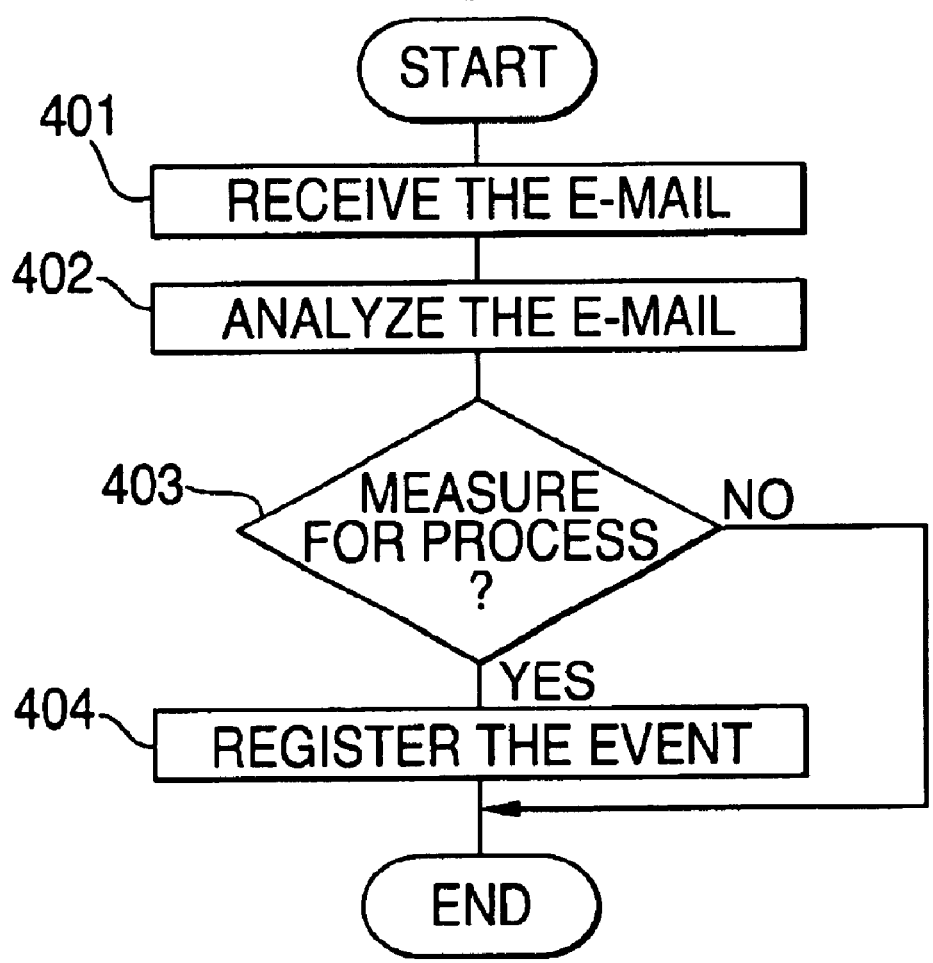

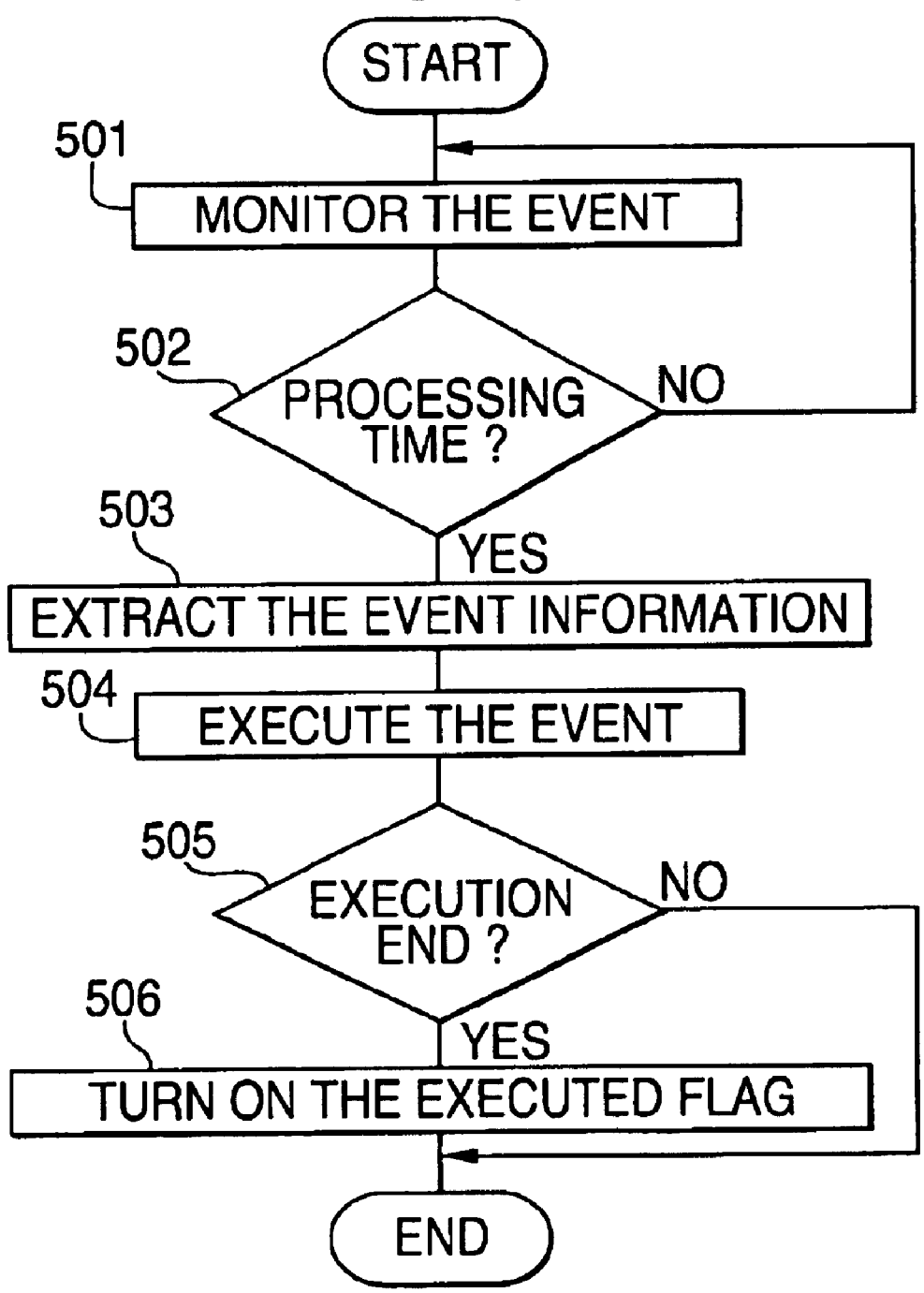

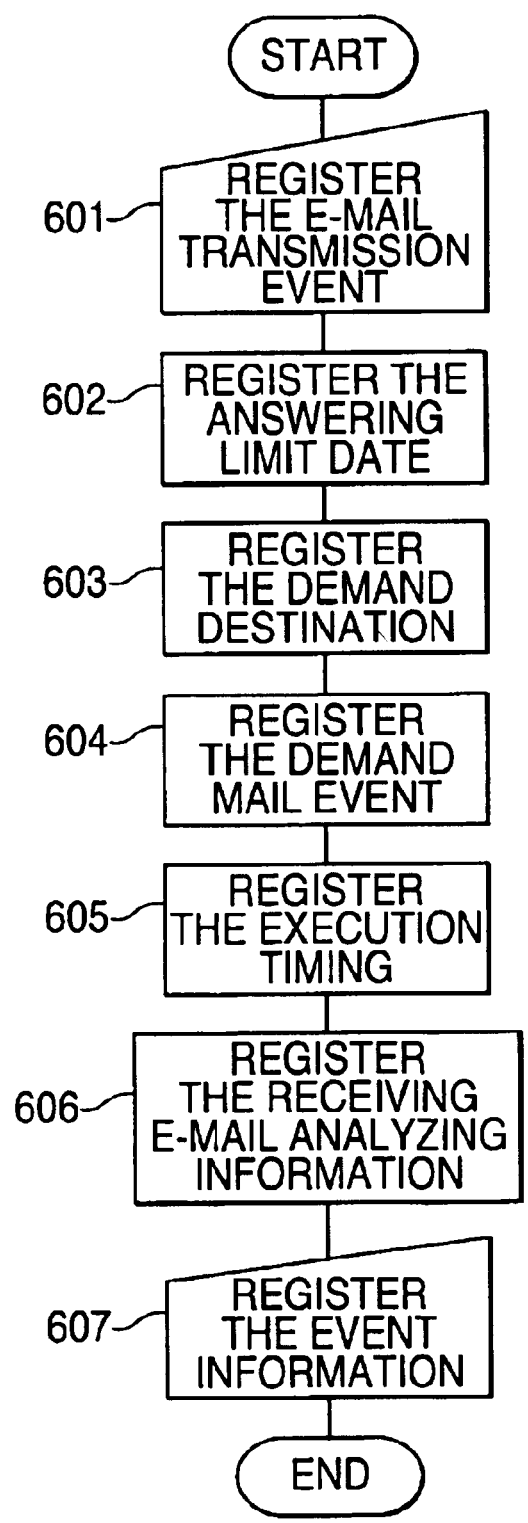

FIG. 7(a)

E-MAIL TRANSMISSION EVENT INFORMATION

| EVENT GROUP ID | 1999072801 |
|---|---|
| EVENT TYPE | 1 |
| TRANSMITTING DESTINATION ADDRESS | nobuo@xyz.co.jp |
| SUBJECT: | GUIDANCE TO THE CONFERENCE (ANSWER IS NECESSARY) 1999072801 |
| FREE HEADER INFORMATION | |
| TEXT | kaigi.txt |
| ATTACHED FILE | tempu.doc |
| EXECUTION TIME | REAL-TIME |
| EXECUTED FLAG | |

FIG. 7(b)

TRANSMITTING DESTINATION INFORMATION

| EVENT GROUP ID | 1999072801 |
|---|---|
| TRANSMITTING DESTINATION ADDRESS | nobuo@xyz.co.jp |
| SUBJECT: | GUIDANCE TO THE CONFERENCE (ANSWER IS NECESSARY) 1999072801 |
| ANSWERING LIMIT DATE | 19990808 |
| ANSWERING DATE AND TIME | |
| DEMAND DESTINATION ADDRESS | koma@xyz.co.jp |

FIG. 7(c)

DEMAND MAIL EVENT INFORMATION

| EVENT GROUP ID | 1999072801 |
|---|---|
| EVENT TYPE | 3 |
| TRANSMITTING DESTINATION ADDRESS | koma@xyz.co.jp |
| SUBJECT: | GUIDANCE TO THE CONFERENCE (DEMAND) 1999072801 |
| FREE HEADER INFORMATION | |
| TEXT | tokusoku.txt |
| ATTACHED FILE | tempu.doc |
| EXECUTION TIMING | 199908090800 |
| EXECUTED FLAG | |

FIG. 8(a)

ANALYZING INFORMATION

| FROM: CONDITION | |
|---|---|
| SUBJECT: CONDITION | 1999072801 |
| FREE HEADER CONDITION | |
| TEXT CONDITION | |

FIG. 8(b)

EVENT INFORMATION

| EVENT TYPE | 2 |
|---|---|
| TRANSMITTING DESTINATION ADDRESS | |
| SUBJECT: | |
| FREE HEADER INFORMATION | |
| TEXT | orci.txt |
| ATTACHED FILE | tempu.doc |
| EXECUTION TIMING | REAL-TIME |
| EXECUTED FLAG | |

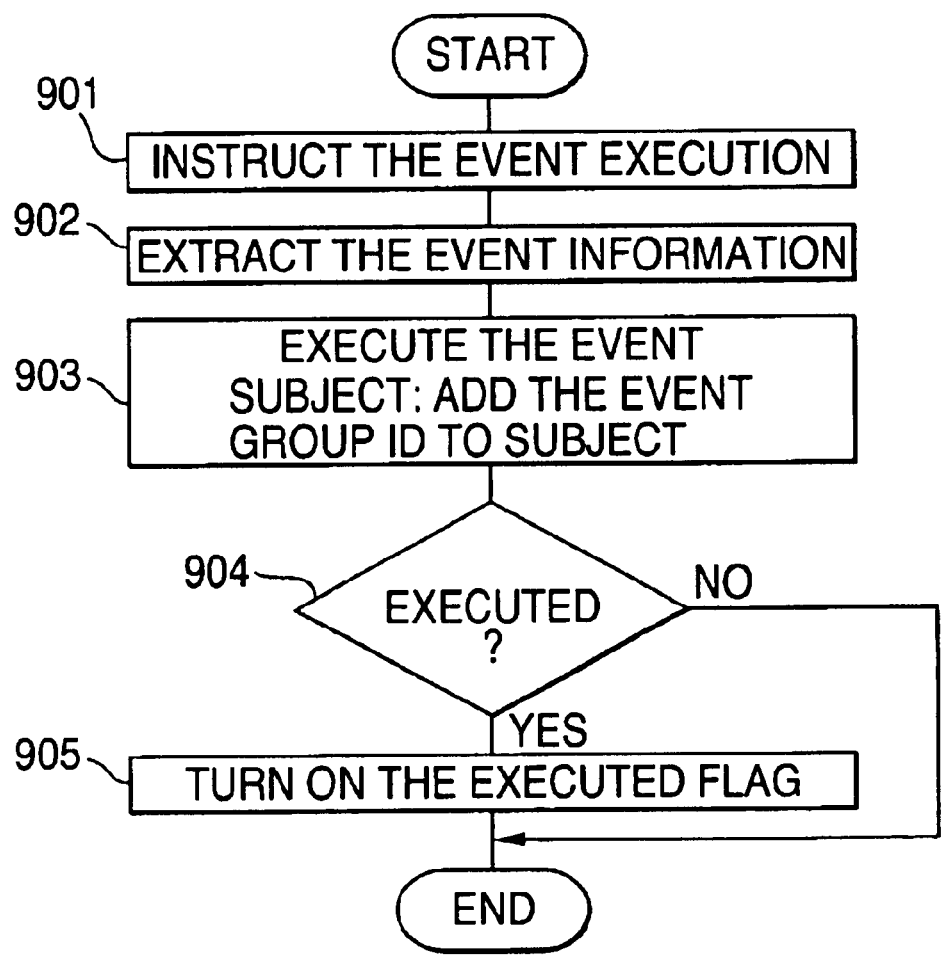

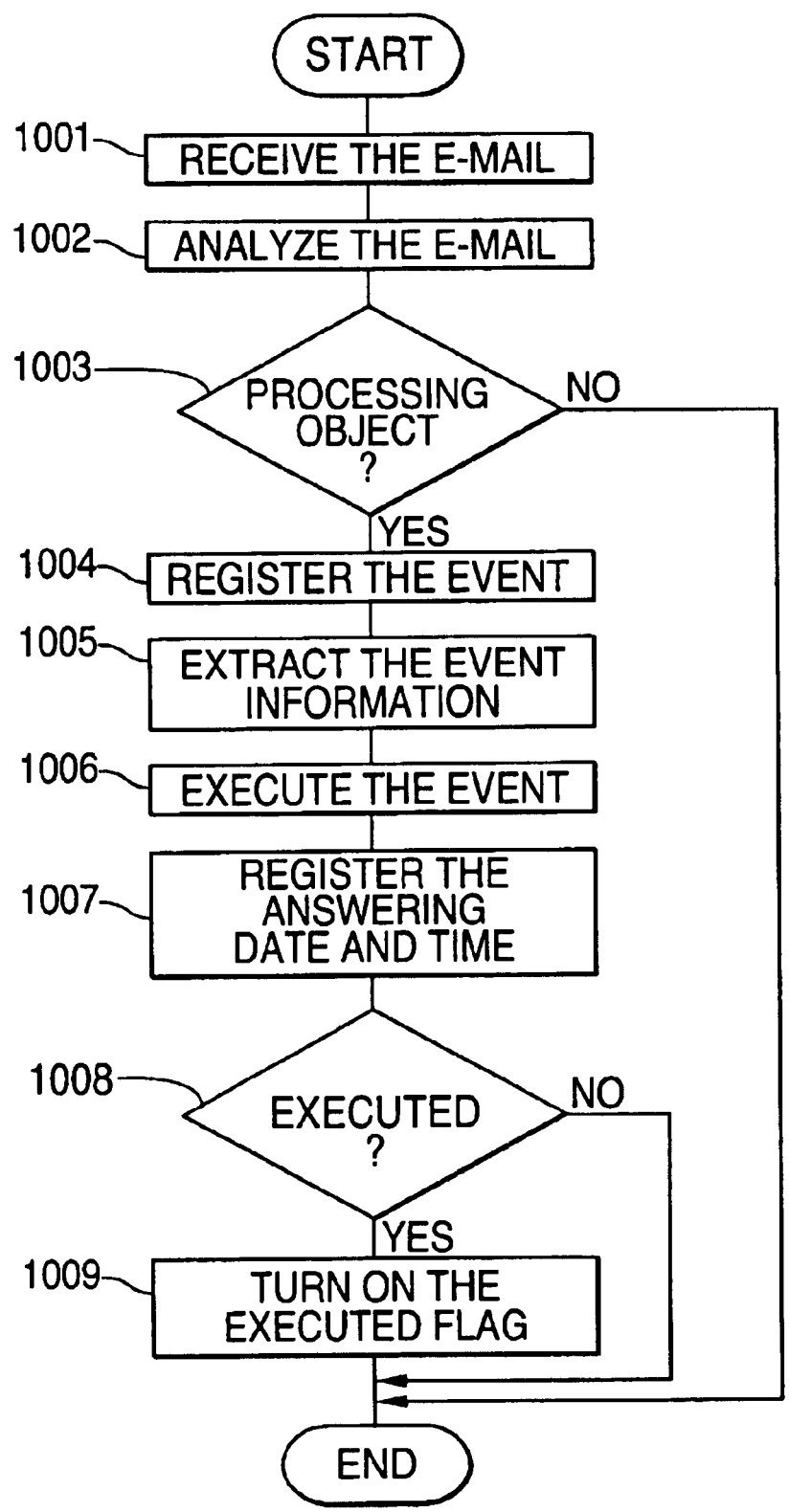

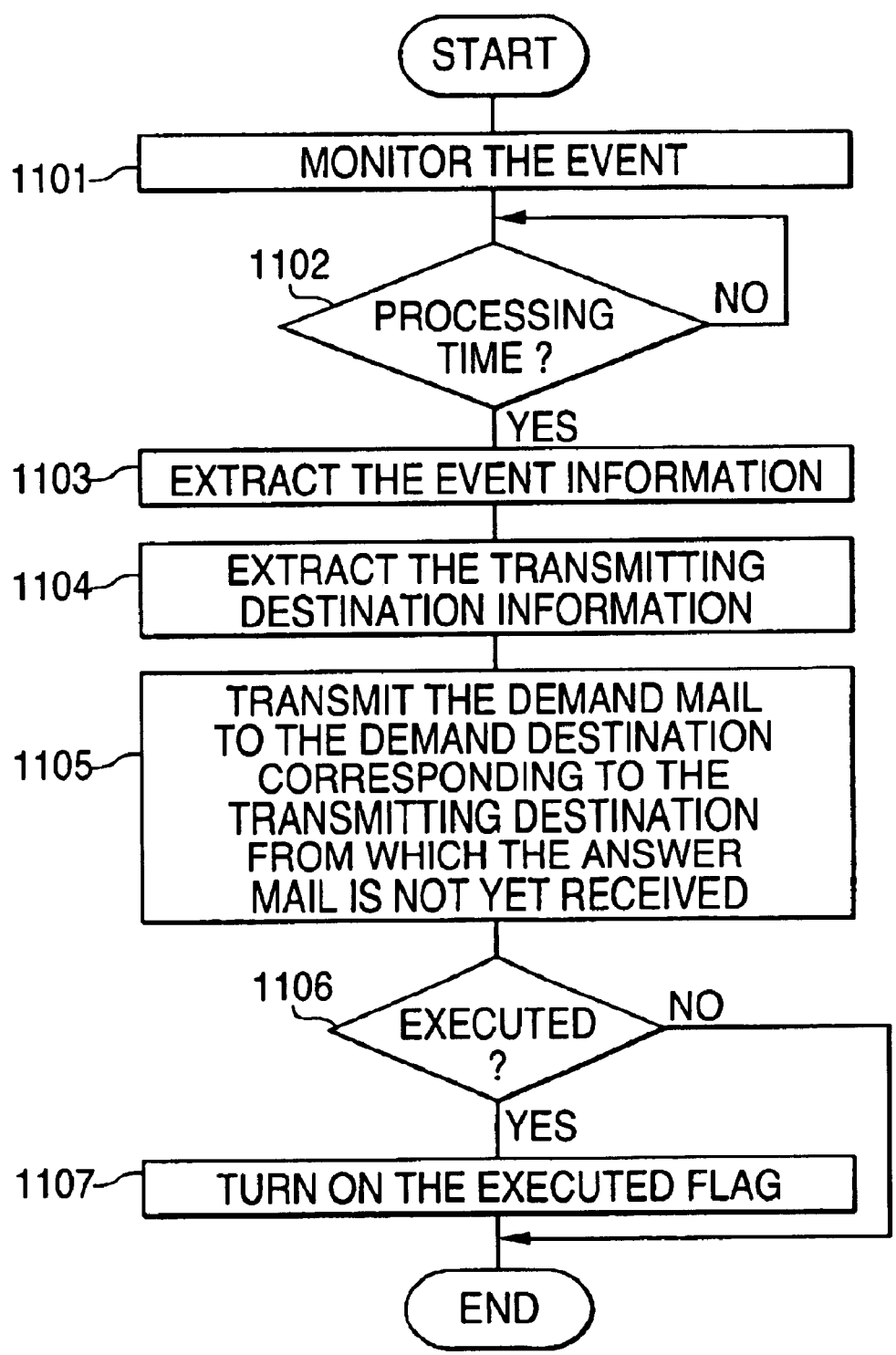

FIG. 12(a)

PROGRAM EXECUTION EVENT INFORMATION

| EVENT TYPE | DESIGNATE THE EVENT TYPE (EXAMPLE: 4) |
|---|---|
| EXECUTION PATH | PROGRAM EXECUTION PATH (EXAMPLE:C:YdouboYdoubo.exe) |
| EXECUTION TIMING | |

FIG. 12(b)

MESSAGE DISPLAY EVENT INFORMATION

| EVENT TYPE | DESIGNATE THE EVENT TYPE (EXAMPLE: 5) |
|---|---|
| MESSAGE | FILE NAME OF MESSAGE TEXT (EXAMPLE: mes.txt) |
| EXECUTION TIMING | |

ELECTRONIC MAIL COMMUNICATION APPARATUS AND RECORDING MEDIUM

BACKGROUND OF THE INVENTION

1. Field of the Invention

The present invention relates to an E-mail communication apparatus for executing E-mail communications using a communication line.

2. Description of the Related Art

Generally, when E-mail is received, the contents of the E-mail are manually verified and a sentence is generated responding to the contents and the reply is transmitted.

Even in the case of an automatic reply method, a reply is immediately sent when the E-mail is received or, the reply is simply sent in a pre-determined format without verifying the contents of the received E-mail.

Further, when E-mail requesting a reply is transmitted to a plurality of distant parties (listings in a mailing list), replies from the recipients are sent manually and a reply is again requested from the recipients who have not yet replied.

Reply mail is basically transmitted manually and when a large amount of inquiry E-mails are received, many man-hours are required to reply to these E-mails.

In addition, even in the case of the automatic reply method, only a formatted E-mail is sent. Therefore, a manual process is essentially required to reply to different E-mail formats and, therefore, considerable labor is required.

Further, when an E-mail requesting a reply is transmitted to a plurality of parties (in the mailing list), replies from the original recipients are administrated manually and another request for a reply from recipients who have not yet replied must be transmitted. In addition, when the reply demand is done with E-mail, it is meaningless to demand a reply with the same E-mail in which a reply has not yet been received.

SUMMARY OF THE INVENTION

The present invention has been proposed to overcome the problems explained above and, therefore, it is an object of the present invention to automatically transmit E-mail in which the reply process for every E-mail pattern and the reply demand when no reply is sent are respectively considered for situations where the E-mail is received by the parties or not received by parties, and the reply requested E-mail is transmitted by selecting, case by case, the E-mail addresses of the requesting parties.

In view of solving the problems explained above, an E-mail communication apparatus has an E-mail receiver connected to a communication line receiving E-mails from the communication line, a storage device storing analysis information for analyzing contents of received E-mails and event information, corresponding to the analysis information, to be driven when the received E-mail corresponds to the analysis information, an E-mail analyzer analyzing contents of E-mails received by the E-mail receiver based on the analysis information stored in the storage device, and an event driver reading from the storage device when an E-mail received by the E-mail analyzer corresponds to the analysis information and driving the event based on the event information.

With the structure explained above, the event to be driven corresponding to receiving the E-mail can be automatically driven by storing corresponding information to pre-analyze the received E-mail and information about the event to be driven when E-mail conforming to the analysis information is received.

Further, even when E-mail conforming to the analysis information is received, the corresponding event need not be immediately executed. Rather, the event can be executed at any desired time by forming the event with an event information monitor so that when event information includes timing information and the E-mail received by the E-mail analyzer conforms to the stored analysis information, the event will be driven based on the event information at the specified time.

Moreover, an automatic reply can be generated by structuring an E-mail transmitter, which is connected to the communication line to transmit E-mail, so that the stored event includes an E-mail transmitting event containing a transmission destination address and a file name of the mail text. When the E-mail transmitting event is executed, the transmitter reads the file corresponding to the file name of the mail text as the mail text and transmits the E-mail to the transmission destination address.

Replies can also be sent with an attachment of any desired file by including the file name of the file to be attached in the event information. The E-mail transmitter then transmits the reply with the file corresponding to the attached file name attached to the reply when the E-mail transmission event is executed.

In addition, the reply can be automatically sent to the transmission destination address by structuring the E-mail transmitter such that the source address of the mail being replied to is used as the transmission destination address if the transmission destination address is not stored in the event information.

Moreover, management of reply E-mails is performed and the reply demand can be automatically executed by structuring a transmission destination address information storage device to store, in correspondence, event group ID, which relates a plurality of events, a transmission address, reply date and time, which indicate the date and time when the reply was received, and reply time limit information, which indicates a time limit for receiving the reply.

A process for inputting the reply time limit information and storing the reply time limit information, transmission address and event group ID to the transmission destination address information storage device, respectively, is also provided. A process is provided to store analysis information, including whether the event group ID is added to the received E-mail, and event information, which is driven when an E-mail having a corresponding analysis condition is received. A process for storing, as a monitoring object of an event information monitor when no reply to the original E-mail has been received, the event information for transmitting an E-mail requesting a reply according to predetermined execution timing is also provided. All of these processes described above are conducted when the original E-mail is transmitted.

When it is detected that the event group ID is included by analyzing the E-mail with the E-mail analyzer when the E-mail is received by the E-mail receiver, the event driver and/or the event information, as the monitoring object of the event information monitor, is/are executed based on the corresponding event information. Then, information indicating that the reply has already been transmitted is stored, respectively, for the transmission address information including the event group ID and transmission address, which are identical to that of the received E-mail stored in the transmission destination address information storage device.

When the event execution timing for transmitting the reply demand with the event information monitor is detected, the E-mail transmitter searches the transmission destination address information storage device to read the transmission destination address information in which the event group ID is already added but the no reply received information is stored and transmits the reply demand to the transmission destination address stored based on the event information for the preset transmission address.

When the transmission destination address of the reply demand mail is the transmission destination address of the E-mail stored in the transmission destination information, the reply demand can be issued directly to the transmission destination address.

Moreover, a more effective process for demanding a reply can be made by storing the transmission destination address as the transmission destination information and the setting the reply demand transmission address as the transmission destination address of the reply demand.

Moreover, replies and reply demands can be managed for a transmission destination address stored in a mailing list by generating transmission destination information for each transmission destination mail address stored in the mailing list. Then, each transmission destination address is stored in the transmission destination information storage device, when use of the mailing list is specified, as the transmission destination for transmission of the E-mail.

The event stored in the event information storage device may include not only the E-mail transmission event but also a program execution event to drive a desired program. The desired program may be driven when E-mail conforming to the analysis information is received by including in the event information of this program execution event information to designate a program execution path. The event driver then drives the relevant program by reading the execution path of the program at the time the program is executed.

BRIEF DESCRIPTION OF THE DRAWINGS

FIGS. 2(a)–2(c) are diagrams illustrating examples of analysis information, event information and transmitting source information;

FIGS. 3(a) and 3(b) are diagrams illustrating examples of the analysis information and event information of the first embodiment;

FIG. 4 is a flowchart illustrating the event registration process for receiving E-mail according to the first embodiment;

FIG. 5 is a flowchart illustrating event monitoring and event driving processes in the first embodiment;

FIG. 6 is a flowchart illustrating the process for storing various pieces of information for executing the processes in the second embodiment;

FIGS. 7(a)–7(c) are diagrams illustrating E-mail event information, transmitting source information and reply demand event information in the second embodiment;

FIGS. 8(a) and 8(b) are diagrams illustrating examples of the analysis information and event information in the second embodiment;

FIG. 9 is a diagram illustrating the analysis information and event information to transmit thank-you E-mail in the second embodiment;

FIG. 10 is a diagram illustrating a process for receiving the reply in the second embodiment;

FIG. 11 is a diagram illustrating the reply demand transmitting process in the second embodiment; and FIGS. 12(a) and 12(b) are diagrams illustrating examples of the program execution event information and display event information.

DETAILED DESCRIPTION OF THE PREFERRED EMBODIMENTS

Figure 1:
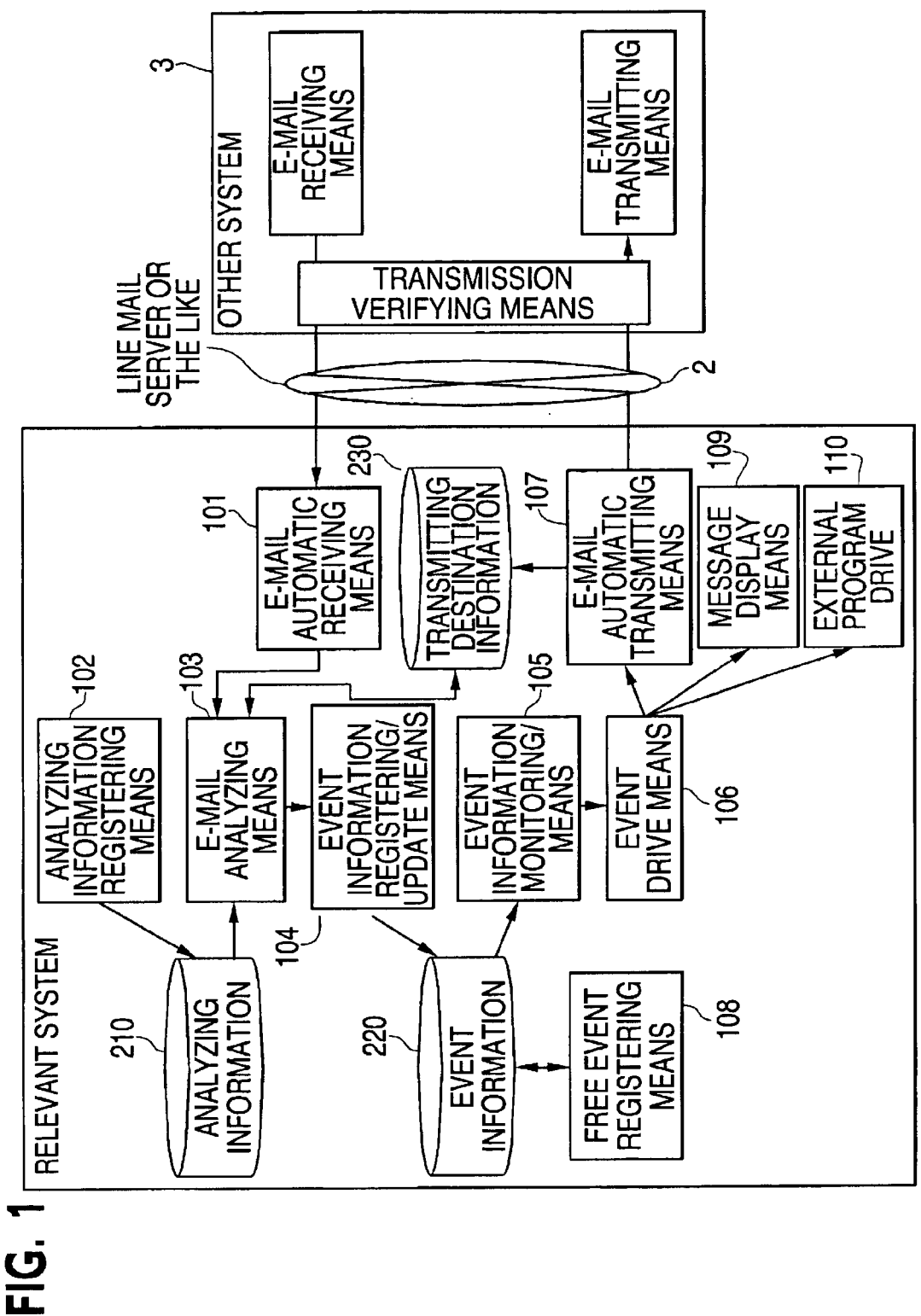
FIG. 1 is a structural block diagram of a preferred embodiment of the present invention.

The preferred embodiment of the present invention will be explained with reference to the accompanying drawings.

FIG. 1 is a block diagram of a preferred embodiment of the present invention. Numeral 1 designates an E-mail communication apparatus of the present invention including an E-mail automatic receiver 101 and an E-mail automatic transmitter means 107, which are connected to a communication line 2 to transmit and receive E-mail with the other terminals 3. Although not illustrated in the figure, the communication line 2 includes a server for relaying and storing E-mails.

The other E-mail communication apparatus 3 enables E-mail communication with the E-mail communication apparatus 1. Here, only one unit is illustrated but a plurality of units may also be used.

An E-mail terminal according to the present invention includes an analysis information storage device 210, an event information storage device 220 and a transmission destination information storage device 230.

The analysis information storage device 210 stores analysis information corresponding to the E-mail illustrated in FIG. 2(a) and event information illustrated in FIG. 2(b).

The analysis information illustrated in FIG. 2(a) includes the following information. In the "From: condition" field, the information to analyze "From:", indicating the transmission source of the receiving E-mail, is stored. In the "Subject: condition" field, the information to analyze "Subject:", which is information about the title E-mail, is stored. In the desired header condition field, the information to analyze the desired header information accompanying the E-mail is stored. In the E-mail text condition field, the information to analyze the text of the E-mail is stored. If information is not stored in a particular field, analysis of the relevant field is never conducted.

Moreover, to designate the above conditions, it is also possible to designate not only perfect matching but also former matching, latter matching and intermediate matching using a well known technique such entering an identifier in the former or latter area of a character string. Moreover, event information executed when E-mail conforming to the analysis information is also stored in the analysis information storage device 210 corresponding to the analysis information explained above.

As will be described later, when E-mail corresponding to the analysis information is received, the corresponding event information is transferred to the event information storage device 220. Moreover, this event information storage device 220 is capable of storing the event information to be executed as desired by the desired event storage device 108 explained later, in addition to the event information stored when E-mail corresponding to the analysis information is received, as explained above.

This event information includes the following information as listed in FIG. 2(b). In the event group ID field, the event group ID to be used for verifying replies and transmitting reply demands, where a relationship between them is stored. In the event type field, the information to designate the type of event to be driven is stored. In this embodiment, when a 1 is stored in this field, it is assumed that the event type stored is to transmit the E-mail. The transmission destination address designates the transmission destination address for transmission of the E-mail. When it is blank (omitted), the "From: address" of the received E-mail is used as the transmission destination address of the reply. The "Subject" field: is used to store the subject of the transmitted E-mail. When it is blank (omitted), the contents of "Subject:" of the received E-mail is used for the reply. In the desired header information field, the information to analyze the desired header information accompanying to the received E-mail is stored. In the mail text field, a name of file containing the text of reply is stored. In the attached file field, a name of a file attached to the E-mail is stored. In the execution timing field, the execution timing of a relevant event is stored. In the event information, a flag area to indicate whether the relevant event has been completed is also set.

The event information is stored in the event information storage device when E-mail corresponding to the corresponding analysis information is received. Moreover, the transmission destination information 230 of FIG. 2(c) stores the information about the transmitted E-mail to verify whether the reply was received and transmit the reply demand mail. This information includes the following information. In the event group ID field, an event group ID is stored as in the case of the event information. In the transmission destination address field, the address for transmitting the reply is stored. In the "Subject:" field, a tile of the transmitted E-mail is stored. In the reply date limit field the date limit for replying to the relevant transmitted E-mail is stored. In the reply date and time field, the reply date and time from the transmitting destination is stored. When the reply is not yet returned, this field is blank. In the reply demand destination address, the reply demand is stored when the transmitting destination does not reply.

The analysis information registrar 102 registers analysis information and corresponding event information. This can be realized, in practice, by a well known input device and a man-machine interface (program), for example, for interactive registration.

When the E-mail automatic receiver 101 receives E-mail, the E-mail analyzer 103 analyzes the E-mail with reference to the analysis information stored in the analysis information storage device 210. Here, when the E-mail corresponds to the analysis information, a message is sent to an event information registration/update unit 104. The event information registration/update unit 104, having received this message, stores the event information corresponding to this analysis information in the event information storage device 220.

In this embodiment, the event information is stored by transferring the event information to the event information storage device 220 provided separately from the analysis information storage device 210. However, this is not always necessary in a real memory system. For example, it is also possible to introduce a virtual structure by adding, for example, information such as a flag or the like to identify whether a condition is satisfied in the event information stored in the analysis information storage device 210.

Moreover, an event is not always executed just when E-mail corresponding to the analysis information is received. It is also possible to execute the event which is not directly related to receiving E-mail by registering event information by desired event registrar 108.

An event information monitor 105 monitors event information stored in the event information storage device 220 and drives the corresponding event by driving the event driver 106 when the event satisfies an event drive condition. The event to be driven causes, for example, the E-mail automatic transmitter 107 to transmit the E-mail and causes a message display unit 109 to, for example, notify this to a user and drive an external program.

FIGS. 3(a) and 3(b) are examples of the stored analysis information 211 and event information 221. It is also assumed that registration is made to the analysis information storage device 210 by the analysis information registrar 102.

First, the process for when the E-mail is received will be explained using the flowchart in FIG. 4.

The E-mail automatic receiver 101 extends the connection to an E-mail server not illustrated on the communication line 2 to receive the arriving E-mail (401).

The E-mail analyzer 103 analyzes the received E-mail to determine whether an automatic response should be made through collation with the analysis information 211 (402). In the case when the received E-mail requires an automatic response as a result of this analysis ("Subject:" is "User Registration") (403), the event information 221 corresponding to the analysis information 211 is stored on the event information storage device 220 by the event information registration/update unit 104.

Next, monitoring and execution of the stored event information will be explained with reference to the flowchart of FIG. 5.

The stored event information is monitored by the event information monitor 105 until the processing time, based on the stored execution timing, has come (502, 503). In this example, monitoring is continued until an hour after the time in which the E-mail is received and then event information is stored.

When the monitoring time is over, the event information monitor 105 instructs the event driver 106 to drive the event process (503) and the event driver 106, having received an instruction, drives the corresponding operation stored as the event information 221 (504).

First, the type of process to be driven corresponding to the stored event type stored is determined. In this example, 1 is set as the event type and this event type 1 is assumed to be previously set to execute the automatic E-mail transmission by driving the E-mail automatic transmitter 107. In the example of this embodiment, since the transmission destination address in the event information is omitted, the "From: address" of the reply E-mail is defined as the transmitting destination address and since the "Subject:" is also omitted, "Re," indicating that the E-mail is a response (reply), is added before the "Subject:".

Thereby, the text file, mail.txt, and attached file name, tenpu.doc, are transferred to the E-mail automatic transmitter 107 together with the "From:" and "Subject:" information.

The E-mail automatic transmitter 107, having received the information explained above, assembles the E-mail data, connects to the E-mail server (not illustrated) on the communication line 2 and then transmits the E-mail. Upon completion of this process, a flag, which signals completion of process, is turned ON for the event information to complete the process (505, 506).

In this example, it is assumed that a thank you E-mail will be transmitted if a reply is received and a reply demand is sent if a reply is not sent after one week has passed from transmission of original E-mail.

With reference to FIG. 6, an event to transmit the E-mail is stored in the event information storage device 220 by the desired event registrar 108 (601). An example of the stored event information 221 is illustrated in FIG. 7(a). The event group ID is the number given to manage events which are related to each other.

Next, the transmitting destination information 231 for the E-mails to be transmitted simultaneously is stored in the transmitting destination information storage device 230 (602, 603). This is conducted using information such as the event group ID, transmitting destination address, "Subject:" in the event information 221 for E-mail transmission and by accepting an input of the reply date limit, reply date and time and reply demand destination address.

An example of the stored transmitting destination information 231 is illustrated in FIG. 7(b). When a mailing lists is used for the transmitting destinations, the transmitting destination information is generated for each transmitting destination address included in the mailing list.

Here, the reply demand destination address can be input by a user each time such E-mail is required. However, it is more desirable for the destination address to be automatically managed in correspondence with the transmitting destination address in an address list file to input the E-mail transmitting destination address.

Moreover, the event for transmitting the reply demand E-mail is also scheduled for one week after the transmission of the original E-mail (604, 605). An example of stored event information 221 is illustrated in FIG. 7(c). The event type 2 defines an event, as explained later, to extract transmitting destination information corresponding to the an event group ID by searching the transmitting destination information storage device 230 and then to transmitting the reply demand E-mail based on the transmitting destination information.

Moreover, the analysis information 211 and the event information 221 corresponding to such analysis information are also registered by the analysis information registrar 102 to transmit the thank-you E-mail in response to the reply E-mail when the reply E-mail has been sent.

In this case, the analysis information including the event group ID is designated to the "Subject:" field of the E-mail. Examples of the stored analysis information and the event information corresponding thereto are illustrated in FIGS. 8(a) and 8(b). The event type 2 of the stored event information transmits the E-mail and records the reply date and time as transmitting source information. Here, it is preferable to be able to input each item of information illustrated in FIG. 6 with an interactive display image input. In this example, since preparation is completed, the event information monitor 105 drives the E-mail transmitting process by the event driver 106 based on stored the event information 221 (901, 902).

The E-mail automatic transmitter 107 transmits E-mail based on the event information 221 (903). In this case, transmission is performed by linking the event group ID to the "Subject:" field. This is done because a relationship between the original E-mail and the reply can be checked by verifying the "Subject:" field of the reply, as explained later, since generally the "Subject:" field of replies add the characters (for example, "Re:") indicating that the E-mail is a reply. When the process is completed, a flag indicating that the process is complete is turned ON for the event information to complete the process (904, 905).

Thereafter, when the reply is sent, the process is transferred to the E-mail analyzer 103 through the E-mail automatic receiver 101 (1001, 1002). In this case, for the E-mail corresponding to the analysis information 211, the corresponding event information 221, namely transmitting the thank-you E-mail as illustrated in FIG. 8(b), is input to the event information storage device 220 (1003, 1004).

This event executes in real-time and, therefore, the event information monitor 105 executes, on a real-time basis, the corresponding event information 221 (1005, 1006). This event is an event of type 2 and, therefore, the reply date and time are recorded in the relevant transmitting destination information 231 by searching the relevant event group ID and transmitting the destination address to the transmitting destination information 231 (1007). When this process is completed, a flag is turned ON and the process is complete (1008, 1009).

If no reply is sent, no thank-you E-mail is generated and the reply date and time are not recorded in the transmitting destination information 231. When the reply date and time passes under this condition, it is then time to send a reply demand E-mail, as illustrated in FIG. 7(c) (in this case, 8 a.m., Aug. 9, 1999). After the time when the event information 231 is stored in the event information storage device 220 (1101, 1102), the event information monitor device 105 recognizes the reply demand event of event type 3 and transfers the relevant event information (demanding a reply illustrated in FIG. 7(c)) to the E-mail automatic transmitter 107 (1103) via the event driver 106. The E-mail automatic transmitter 107 determines the event group ID from the transmitting destination information to search the relevant transmitting destination information to determine whether the reply date and time are recorded (1104, 1105). As a result, if the reply date and time are not recorded, the reply demand is transmitted. When the process is completed, a flag is turned ON (1106, 1107).

FIG. 12(a) illustrates program execution event information, of any event type (for example, 3), indicating that the relevant event is the program execution event information, the execution path of program to be executed and timing information to drive the relevant program.

The event information monitor 105 of FIG. 1 recognizes, when the execution timing has come through monitoring of the event information, that the event is the program execution event by identifying the event type, controls the external program driver 110 via the event driver 106 and drives the program.

FIG. 12(b) is the message display event information including the event type information ("4" for example), which indicates the event is the message display event, message information indicating a file name of the message text to be displayed and information regarding execution timing for execution of the display process.

The event information monitor 105 of FIG. 1 recognizes, when the execution timing has come through monitoring of the event information, that the event is the message display event by identifying the event type, controls the message display means via the event driver 106 and displays the message by reading a file having the file name in the message information.

As explained in detail above, the present invention can automatically drive E-mail functions, to a large extent, which have been performed manually in the prior art. Replying to received E-mails of almost all types can be automatically done.

The reply demand E-mail is transmitted and the thank-you E-mail when the reply is received can also be automatically transmitted.

Moreover, in the reply demand mail for requesting a reply to the original E-mail, the effect of this E-mail can be improved by transmitting the reply demand E-mail to a third party who is a superior of E-mail receiving party.

What is claimed is:

1. An E-mail communication method, comprising:

transmitting an E-mail;

automatically determining whether a reply to the E-mail has been received; and automatically transmitting a reply demand after a predetermined time limit has expired if no reply to the E-mail is received, wherein a transmission address of the E-mail is used as a transmission address of the reply demand if the transmission address of the reply demand is not previously stored.

2. The method according to claim 1, wherein if the reply is received, a thank-you E-mail is transmitted to the transmission address of the E-mail.

3. The method according to claim 1, wherein a transmission address of the reply demand is previously stored in a mailing list used to generate the E-mail.

4. An E-mail communication apparatus comprising:

E-mail receiver connected to a communication line receiving E-mail from the communication line;

a storage device storing analysis information, which is information for analyzing a content of the received E-mail, and event information, corresponding to the analysis information, to be driven when the received E-mail corresponds to the analysis information;

an E-mail analyzer analyzing the content of E-mail received by said E-mail receiver based on the analysis information stored in said storage device;

an event driver reading from said storage device, when an E-mail received by said E-mail analyzer corresponds to the analysis information, the event information corresponding to the analysis information, and driving the event based on the event information; and an E-mail transmitter connected to the communication line to transmit E-mail using the communication line, wherein the event stored in said storage device which includes an E-mail transmission event including information designating a transmission destination address and a file name containing text of the E-mail and said E-mail transmitter reads, as the text of E-mail, the file corresponding to the file name during execution of the E-mail transmission event transmitting the E-mail to the transmission destination address.

5. An E-mail communication apparatus as claimed in claim 4, wherein the E-mail transmission event information includes a file name for an attached file and said E-mail transmitter transmits the E-mail by attaching thereto a file corresponding to the attached file name.

6. An E-mail communication apparatus as claimed in claim 4, wherein said E-mail transmitter returns the E-mail using an address of a source of the transmission as the transmission destination address if the transmission destination address is not stored in said storage device.

7. A computer readable recording medium storing a computer program to be read and executed by a computer which is connected to a communication line and includes an E-mail receiver receiving E-mail, comprising:

storing, respectively, analysis information, which is information for analyzing contents of the received E-mail, and event information to be driven when the received E-mail corresponds with the analysis information;

analyzing contents of the E-mail received by the E-mail receiver based on the stored analysis information;

reading the event information corresponding to the stored analysis information when the E-mail received corresponds to the analysis information, and driving an event based on the event information; and transmitting E-mail using the communication line, wherein the stored event information comprises an E-mail transmission event with information designating a transmission destination address and a file name containing text of the E-mail, and said transmitting E-mail comprises reading, as the text of the E-mail, a file corresponding to the file name during execution of the E-mail transmission event that transmitts the E-mail to the transmission destination address.

8. An E-mail communication apparatus 4, comprising:

an E-mail receiver connected to a communication line receiving E-mail from the communication line;

a storage device storing analysis information, which is information for analyzing a content of the received E-mail, and event information, corresponding to the analysis information, to be driven when the received E-mail corresponds to the analysis information;

an E-mail analyzer analyzing the content of E-mail received by said E-mail receiver based on the analysis information stored in said storage device; and an event driver reading from said storage device, when an E-mail received by said E-mail analyzer corresponds to the analysis information, the event information corresponding to the analysis information, and driving the event based on the event information, wherein an event stored in said event information storage device includes a program execution event and the event information of the program execution event includes information designating a program execution path and when the program execution event is executed, the execution path of the program is used to drive the program.

9. An E-mail communication apparatus as claimed in claim 8, further comprising an event information monitor, wherein the event information includes timing information for driving the event and said event information monitor sets, when the E-mail received by said E-mail analyzer corresponds to the stored analysis information, the event information as a monitoring object and instructs said event driver to drive the event based on the event information when the execution timing occurs.

10. An E-mail communication apparatus comprising:

an E-mail receiver connected to a communication line receiving E-mail from the communication line;

a storage device storing analysis information, which is information for analyzing a content of the received E-mail, and event information, corresponding to the analysis information, to be driven when the received E-mail corresponds to the analysis information;

an E-mail analyzer analyzing the content of E-mail received by said E-mail receiver based on the analysis information stored in said storage device;

an event driver reading from said storage device, when an E-mail received by said E-mail analyzer corresponds to the analysis information, the event information corresponding to the analysis information, and driving the event based on the event information;

an event information monitor, wherein the event information includes timing information for driving the event and said event information monitor sets, when the E-mail received by said E-mail analyzer corresponds to the stored analysis information, the event information as a monitoring object and instructs said event driver to drive the event based on the event information when the execution timing occurs; and a transmission destination address information storage device storing, in correspondence, an event group ID, which sets a relationship between a plurality of events, the transmission destination address, reply date and time information, which indicates a date and time when a reply to the E-mail was received, and reply limit information, which indicates a time limit for receiving the reply, wherein a process is provided for inputting the reply limit information and respectively storing the reply limit information, transmission destination address and event group ID in said transmission destination address information storage device for storing, in said storage device, the analysis information conditioned upon whether the event group ID is added to the received E-mail and the event information which is driven when an E-mail corresponding to the analysis condition is received, and registering the event information for transmitting a reply demand E-mail according to the predetermined execution timing to the storage device as the monitoring object of said event information monitor when the reply to the E-mail has not yet been received, wherein when it is detected that the event group ID is included by analyzing the E-mail with said E-mail analyzer when said E-mail receiver has received the E-mail, the process for setting the event drive process by the event driver and/or the event information as the monitoring object of said event information monitor is executed based on the corresponding event information and the information indicating that the reply has already been transmitted is stored, respectively, for the transmission destination address information, including the event group ID and transmission destination address, which are identical to that of the received E-mail stored in said transmission destination address information storage device, and when the execution timing of the event for transmitting the reply demand E-mail with said event information monitor is detected, said E-mail transmitter searches said transmission destination address information storage device to read the transmission destination address information in which said event group ID is added but reply-transmitted information has not yet been stored is read, the transmission destination address of the reply demand E-mail is set based on said transmission destination address information and said reply demand E-mail is transmitted based on the event information for the preset transmission destination address.

11. An E-mail communication apparatus as claimed in claim 10, wherein the transmission destination address of the E-mail stored in said transmission destination address information storage device is set as the transmission destination address of the reply demand E-mail.

12. An E-mail communication apparatus as claimed in claim 11, wherein the address for transmitting the reply demand E-mail is stored in said transmission destination address information storage device and said the reply demand E-mail transmission address is set as the transmission destination address of the reply demand E-mail.

13. An E-mail communication apparatus as claimed in claim 10, wherein when a mailing list is used for the transmission destination address at the time the E-mail is transmitted, the transmission destination information is generated for each address stored in the mailing list and then the transmission destination information is stored in said transmission destination address information storage device.

* * * * *

UNITED STATES PATENT AND TRADEMARK OFFICE
CERTIFICATE OF CORRECTION

PATENT NO. : 6,760,753 B1
DATED : June 6, 2004
INVENTOR(S) : Nobuo Ohgushi et al.

It is certified that error appears in the above-identified patent and that said Letters Patent is hereby corrected as shown below:

Column 9,
Line 22, before "E-mail" insert -- an --;

Column 10,
Line 14, delete "4".

Signed and Sealed this

Twenty-eighth Day of December, 2004

JON W. DUDAS
*Director of the United States Patent and Trademark Office*